Figure 4:
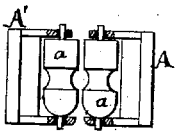

G. A. POLHEMEUS.

3 Sheets—Sheet 1.

ROLLER CABLE GRIP.

No. 10,677.

Reissued Jan. 12, 1886.

WITNESSES:

A. Schehl.

John M. Speer.

INVENTOR

Garret A. Polhemeus

BY Briesen & Steele

ATTORNEYS.

N. PETERS, Photo-Lithographer, Washington, D. C.

3 Sheets—Sheet 2.

G. A. POLHEMEUS.

ROLLER CABLE GRIP.

No. 10,677. Reissued Jan. 12, 1886.

WITNESSES:
A. Schehl.
John M. Speer.

INVENTOR
Garret A. Polhemeus
BY
Briesen & Steele
ATTORNEYS.

N. PETERS, Photo-Lithographer, Washington, D. C.

G. A. POLHEMEUS.

ROLLER CABLE GRIP.

No. 10,677. Reissued Jan. 12, 1886.

WITNESSES:

A. Schehl.

John M. Speer

INVENTOR

Garret A. Polhemeus

BY Briesen & Steele

ATTORNEYS.

N. PETERS. Photo-Lithographer, Washington, D. C.

UNITED STATES PATENT OFFICE.

GARRET A. POLHEMEUS, OF NYACK, NEW YORK.

ROLLER CABLE-GRIP.

SPECIFICATION forming part of Reissued Letters Patent No. 10,677, dated January 12, 1886.

Original No. 328,517, dated October 20, 1885. Application for reissue filed November 28, 1885. Serial No. 184,214.

*To all whom it may concern:*

Be it known that I, GARRET A. POLHEMEUS, a citizen of the United States, residing at Nyack, in the county of Rockland and State of New York, have invented a new and useful Grip for Cable Railroads, of which the following is a specification.

My invention relates to improvements in roller cable-grips operated by hydraulic or pneumatic power; and the objects of my invention are, first, to quickly and accurately pick up and receive a cable; second, to hold the same firmly with the least possible jerking or jar of the car and with small strain or wear of the cable; third, to release the cable instantly when desired. I attain these objects by the mechanism shown in the drawings hereto attached, in which—

Figure 2:
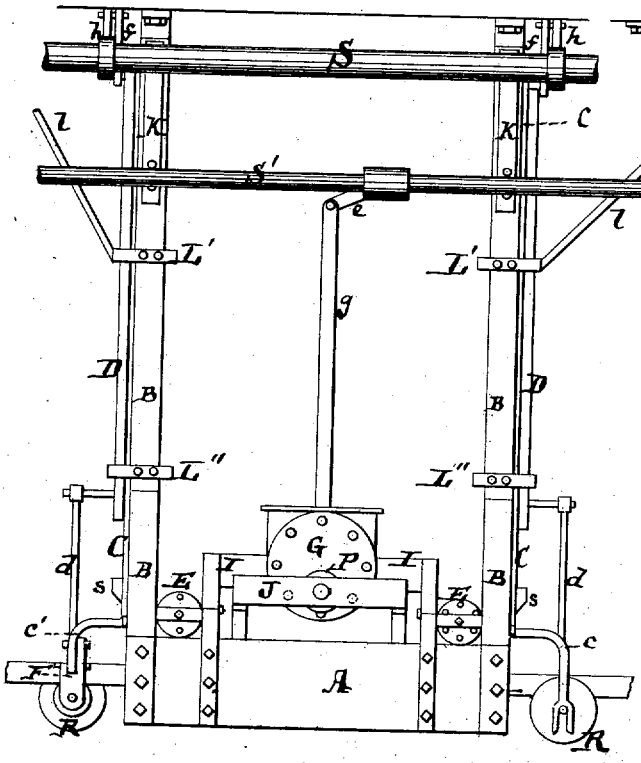
Figure 1:
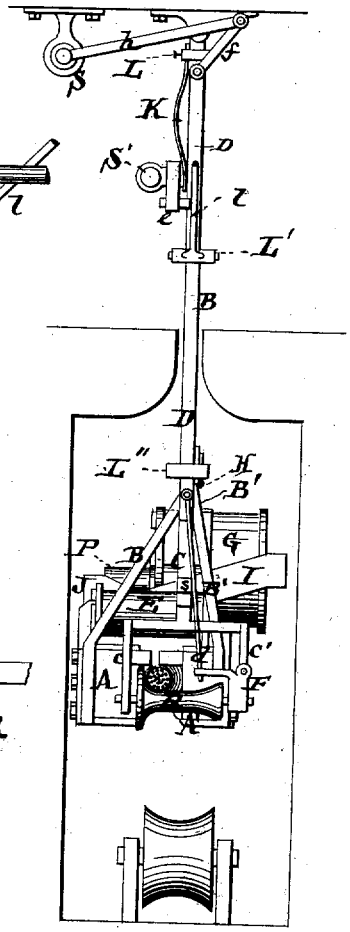
Figure 3:
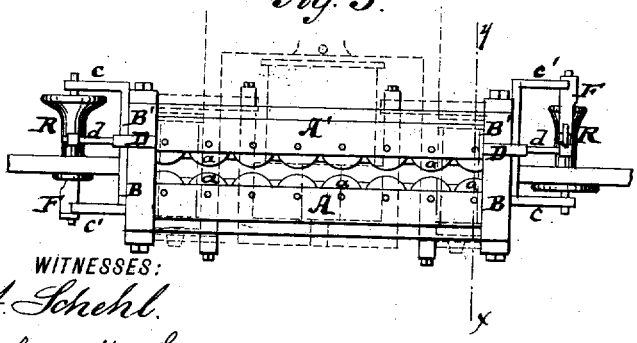
Figure 5:
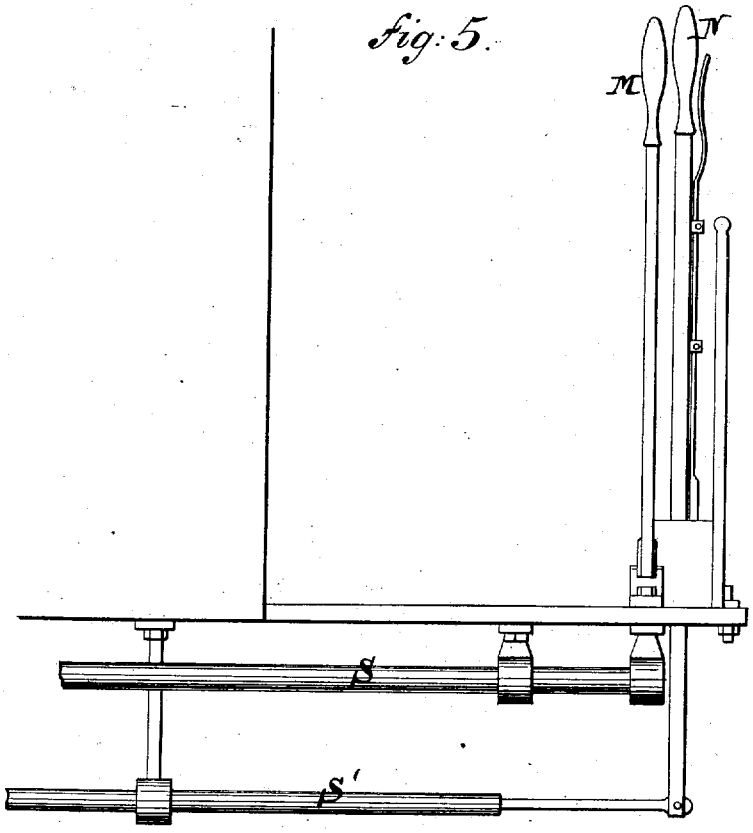
Figure 6:
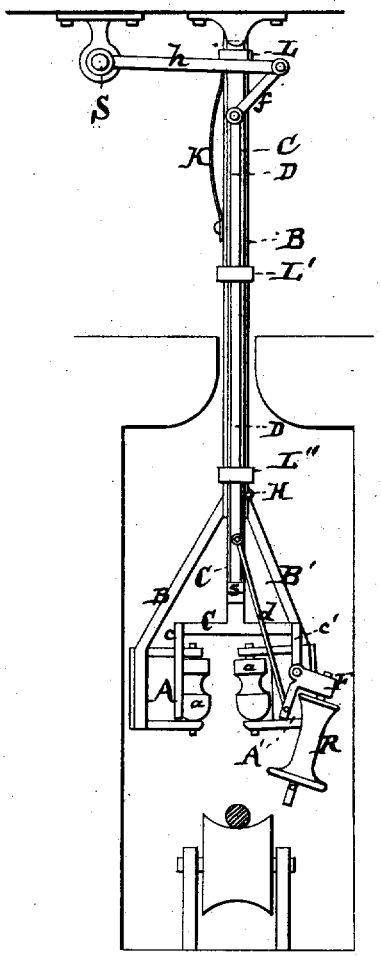
Figure 7:
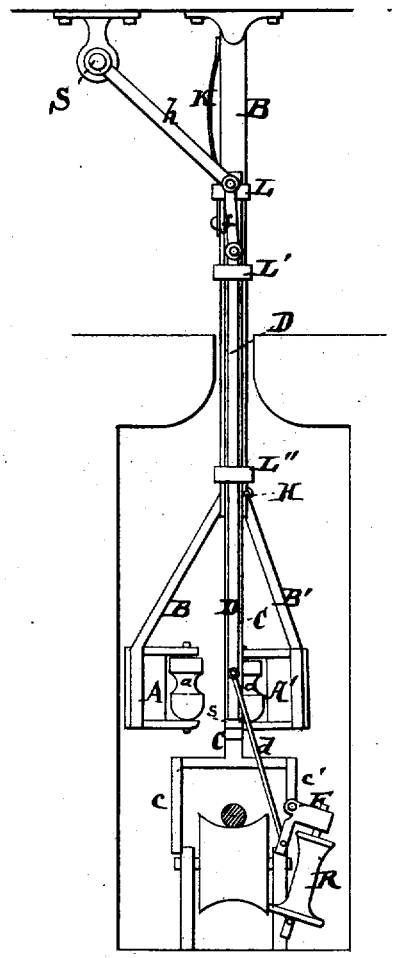

Figure 1 is a front view of the machine. Fig. 2 is a side view; Fig. 3, a top view, in which the parts lying above the grip-plates are represented by dotted lines. Fig. 4 is a section of the grip-plates and rollers along the line *x y*, Fig. 3. Fig. 5 shows the attachment of the levers on the platform for working the grip. Figs. 6 and 7 are detail end views of the said machine.

Similar letters refer to similar parts throughout the several views.

A A′ are the grip-plates, containing the rollers *a a*, revolving in sockets, as in my patent No. 305,107, dated September 16, 1884. At each end of each roller *a* are pins passing through slots in the top and bottom plates, admitting of a slight lateral motion. Each roller *a* is shown in Fig. 4 to be grooved in the middle to fit the cable, rounded at the lower end, and provided with the pins at both ends.

The grip-plates A A′ are bolted at each end to the steel bars B B′. The bars B, bent as shown in Fig. 1, pass through the opening of the tube and bolt to the floor of the car. The bars B′ swing laterally on the hinge H, which connects them to the fixed bars B.

On the outside edge of the bars B, Fig. 2, slide the bars C and D, held in position by the bands L, L′, and L″. L′ and L″ are stationary, being bolted to B. L is bolted to the bar C and moves with it upon B.

The bar C, forked at the lower end, carries the curved arms *c c′*. At the lower end of *c′* is hinged the roller-arm F, carrying the roller R. From the lower end of D the rod *d* passes to the roller-arm F, to which it is pivoted. Both bars C and D are moved vertically by the link *f* and arm *h*, which is attached to the shaft S, the link *f* being pivoted to the bar D.

By the rotation of the shaft S the bar D is pushed down, and the rod *d*, bearing on F, throws the roller R into a vertical position. (See Fig. 6.) The lower end of D, striking the stop *s* on the bar C, forces C down until the lower end of the roller R passes below the line of the cable. (See Fig. 7.) Reversing the motion of the shaft S, the roller R is drawn up horizontally under the cable, the upper end of the bar D strikes the band L and lifts C, carrying with it the roller R, and bringing the cable between the grip-plates. (See Fig. 1.)

G is a hydraulic or pneumatic pump, hinged to the bar I, which passes around it and is bolted to the grip-plate A. The plunger P passes through and is keyed to a bar, J, which is bolted to the grip-plate A′.

E E are cylinders, containing spiral springs whose plungers bear against bars bolted to B′ and J. These cylinders are pivotally connected to bars passing from B to the bar I. When the pressure is removed from the plunger P, the springs in the cylinders E force the grip-plate A′, swinging laterally upon the bar B′ from the hinge H away from the stationary grip-plate A, releasing the grip and allowing the cable to run freely upon the roller R. The bar J, connecting A′ with the plunger P, drives P back into the cylinder G.

K is a spring, bolted to B at its lower end and passing under the band L. This spring is compressed by L and assists in holding the bar C firmly in position when raised, and thereby also the roller R.

The rods *l l* are stays bolted to the floor of the car.

The shaft S′ is attached by the link *e* to the arm *g*, which operates the pump G.

The shafts S and S′ are operated from the platform of the car by the levers M and N, Fig. 5.

The drawings indicate the application of the grip to a cable running in a tube beneath the surface of the ground. The same mechanism, by shortening the bars B, C, and D, is applicable to an elevated cable road.

The improvements in the cable-grip above described upon the "combination cable-grip," No. 305,107, patented by me September 16, 1884, consist in simplifying the mechanism by reducing the number of parts; in new combination for the picking up of the cable; in a change in the form of the grip-rollers by grooving them to fit a cable, rounding the lower ends, omitting the flange and adding the pins at each end, and in the use of one fixed and one laterally-swinging grip-plate instead of two sliding horizontally; and

What I claim as my invention, and desire to secure by Letters Patent, is—

1. The grip-plates, one stationary, the other moving laterally upon a hinge, combined with a hydraulic or pneumatic cylinder, said plates being connected to said cylinder, substantially as described.

2. In combination with a cable-grip, the sliding bars C and D, curved arms *c c'*, roller-arm F, roller R, and rod *d*, all connected to the shaft S by the link *f*, and arm *h* for lifting and introducing the cable within the grip-rollers, substantially as set forth.

3. The combination of the fixed bar B, sliding bar C having projection *s*, sliding bar D, and band L with the spring K, which is secured at one end to the bar B, while its other end passes under the band L, and which serves to hold the bar C and roller R in the raised position, substantially as herein shown and described.

4. The grip-plates A A', provided with sockets and combined with the rollers *a a*, which are grooved in the middle to fit the cable, rounded at their lower ends, and provided with end pins that enter slots in the grip-plates, substantially as herein shown and described.

GARRET A. POLHEMEUS.

Witnesses:

JOHN G. DONANCE,

HARRY M. TURK.